United States Patent [19]

Kloberdanz

[11] Patent Number: 5,531,811
[45] Date of Patent: Jul. 2, 1996

[54] METHOD FOR RECOVERING ENTRAINED LIQUID FROM NATURAL GAS

[75] Inventor: Thomas W. Kloberdanz, Rawlins, Wyo.

[73] Assignee: Marathon Oil Company, Findlay, Ohio

[21] Appl. No.: 291,261

[22] Filed: Aug. 16, 1994

[51] Int. Cl.$^6$ ........................................... B01D 19/00
[52] U.S. Cl. .......................... 95/261; 96/208; 96/212; 96/216; 166/105.500
[58] Field of Search .................. 95/261, 269; 96/208, 96/212, 216; 55/448, 457, 456, 452; 166/265, 105.5, 267

[56] References Cited

U.S. PATENT DOCUMENTS

| | | | |
|---|---|---|---|
| 1,138,460 | 5/1915 | Derby | 55/452 |
| 1,896,111 | 2/1933 | Simmons | 166/265 |
| 2,413,324 | 12/1946 | Holzwarth | 55/452 |
| 2,754,970 | 7/1956 | Ross | 55/457 |
| 3,204,696 | 9/1965 | Priester et al. | 55/456 |
| 3,641,745 | 2/1972 | Moore | 55/457 |
| 3,713,279 | 1/1973 | Moore | 55/482 |
| 4,015,958 | 4/1977 | Leschanske et al. | 55/235 |
| 4,268,277 | 5/1981 | Rooker | 96/269 |
| 4,531,584 | 7/1985 | Ward | 166/265 |
| 4,886,116 | 12/1989 | Garrison | 166/105.5 |
| 5,256,171 | 10/1993 | Payne | 95/261 |

FOREIGN PATENT DOCUMENTS

| | | | |
|---|---|---|---|
| 92/15386 | 9/1992 | WIPO | 96/208 |

OTHER PUBLICATIONS

Chapter 18—"Gas–Phase Continuous Systems," In Perry's Chemical Engineers' Handbook, 6th ed., edited by Robert H. Perry, Don W. Greer, and James O. Maloney, New York, McGraw–Hill Book Co., 1984, pp. 18–73 through 18–75, Fig. 18–109.

Primary Examiner—Jay H. Woo
Assistant Examiner—Duane S. Smith
Attorney, Agent, or Firm—Jack L. Hummel; Jack E. Ebel

[57] ABSTRACT

A process for recovering entrained liquid from natural gas. The gas containing entrained liquid flows from a subterranean formation via a well into a gas/liquid separation chamber where the liquid and gas are separated by centrifugal force. One or more vanes mounted in one or more slits in the separator wall extend into the separation chamber and aid in transposing liquid through the slit or slits. Outside the chamber, the liquid drains into a storage tank. The gas is vented to the atmosphere or to a gas collection system. The separator chamber may be mounted inside a storage tank and may have an external shell around the chamber wall.

16 Claims, 3 Drawing Sheets

METHOD FOR RECOVERING ENTRAINED LIQUID FROM NATURAL GAS

BACKGROUND OF THE INVENTION

1. Field of the Invention

This invention relates generally to a method for recovering entrained liquid from natural gas, and in particular to a method for recovering the entrained liquid in an economical and environmentally attractive manner.

2. Description of Related Art

When fluids are produced from a subterranean formation via a well penetrating the formation, they are commonly stored temporarily in a tank adjacent the well. A portion of the produced fluid is frequently natural gas containing entrained droplets of liquid hydrocarbons, water, and/or brine. The droplets become entrained in the gas either by mechanical action during production or by condensation of a portion of the gas as the temperature decreases during and after production. It is a widespread practice to vent both the gas and the entrained liquid to the atmosphere. In the past, some or all of the entrained liquid was separated from the gas and dumped into unlined earthen pits adjacent the well, thereby wasting a valuable and irreplaceable resource. The dumped liquid then evaporated and/or seeped into the ground, potentially causing severe air, soil, and groundwater contamination. Liquid disposal in unlined pits is now generally prohibited by environmental regulations.

In addition to the gas discussed in the preceding paragraph, produced liquid containing entrained gas is frequently stored in a tank near the well. If the liquid is produced at high pressure, the storage tank must either be capable of withstanding the high pressure or have a large vent. One common approach is to utilize an expensive heavy-walled tank. Another frequent approach is to utilize a galvanized tank, sometimes without a cover. However, it is difficult to detect leaks in galvanized type tanks, and valuable hydrocarbons may be lost to evaporation. Liquid storage tanks are also increasingly subject to environmental regulations, including monitoring for leak detection.

Thus, there is a need for a means of reducing the waste of liquid and gaseous hydrocarbons. Yet another need is to comply with regulations concerning the release of hydrocarbons and brine into the environment. An additional need is to reduce the expenses associated with thick walled storage tanks.

Accordingly, a primary object of the present invention is to reduce waste of liquid and gaseous hydrocarbons.

Yet another object of the present invention is to enable compliance with environmental regulations limiting the release of liquid hydrocarbons and brine into the soil, groundwater, and air.

A further object of the present invention is to allow the use economical thin-walled liquid storage tanks that comply with environmental regulations.

SUMMARY OF THE INVENTION

To achieve the foregoing and other objects, and in accordance with the purposes of the present invention, as embodied and broadly described herein, one characterization of the present invention comprises a method for recovering entrained liquid from natural gas which is produced via at least one well penetrating a subterranean formation. The gas and entrained liquid are caused to flow in a helical path through a gas/liquid separator located at the surface and in a fluid flow path between the at least one well and a storage tank. Within the separator, centrifugal force separates the gas and liquid. The liquid is collected in a storage tank, and the gas is vented from the separator.

Another characterization of the present invention comprises an apparatus for recovering entrained liquid from natural gas produced via at least one well penetrating a subterranean formation. The apparatus comprises a separation chamber having a substantially cylindrical perforated wall, a helical passage within the separation chamber, and a means for collecting liquid outside the chamber. The chamber is located at the surface in a fluid flow path between the at least one well and a liquid storage tank. The apparatus also comprises a means for transferring the separated liquid into the storage tank and a means for venting the gas from the separator. The perforations in the chamber wall may be at least one longitudinal slit. A vane may be mounted at the edge of the slit, with an inner portion of the vane extending into the helical passage and forming an acute angle with the chamber wall. A second portion of the vane extends outside the chamber wall. The vane aids in liquid collection by facilitating droplet impingement and flow through the slit. The gas/liquid collector may be mounted inside the storage tank. The collector may additionally comprise a shell outside the collection chamber and an annulus between the chamber wall and the shell.

BRIEF DESCRIPTION OF THE DRAWING

These and other features, aspects, and advantages of the present invention will become better understood with reference to the following description, appended claims, and accompanying drawings where:

DESCRIPTION OF THE PREFERRED EMBODIMENTS

In the method of the present invention, gas containing entrained liquid droplets is produced from a subterranean formation via at least one well. The gas and liquid are separated, and the liquid is retained in a storage tank while the gas is vented to the atmosphere or to a gas collection system.

Figure 1:
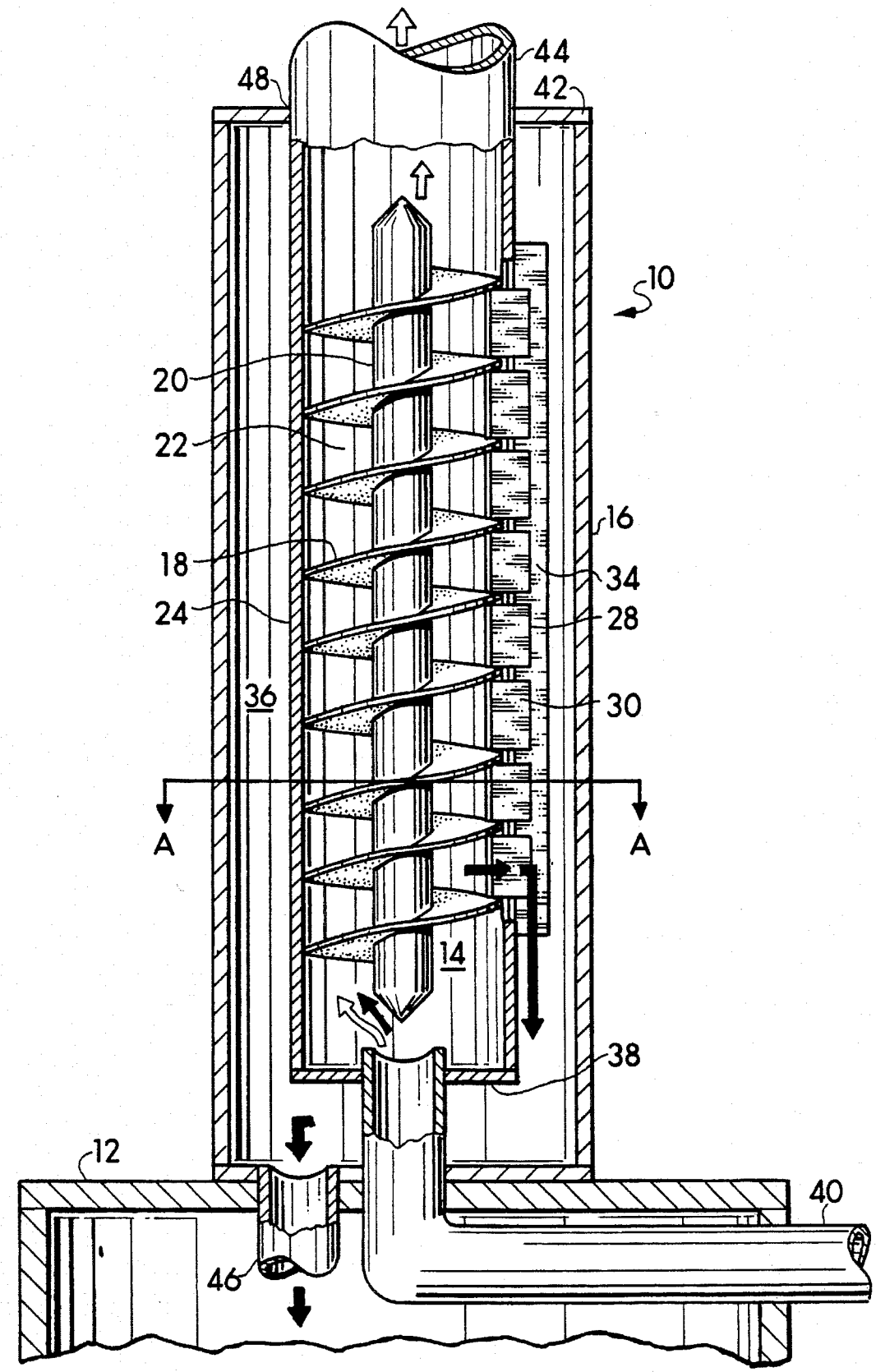
FIG. 1 is a partial cutaway view of one embodiment of the present invention.
Figure 2:
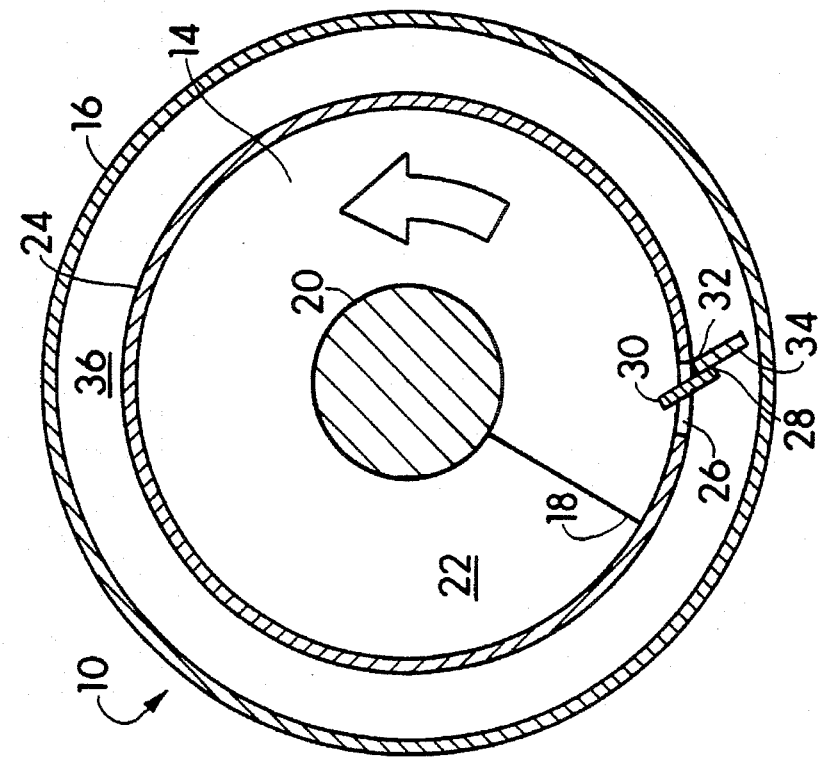
FIG. 2 is a transverse cross sectional view of the embodiment shown in FIG. 1, taken at A—A.

In one embodiment of the present invention, shown in FIGS. 1 and 2, a gas/liquid separator 10 is mounted at the top of a liquid storage tank 12. Separator 10 comprises a generally cylindrical liquid separation chamber 14 within a shell 16. A helical ramp 18 is attached to a central support 20 in the interior of the chamber 14 so that a helical passage 22 is formed between the central support 20, the ramp 18, and the chamber wall 24. At least one longitudinal slit 26 perforates the chamber wall 24. A vane 28 is mounted at the edge of the at least one slit 26 so that an inner portion 30 of vane 28 extends through the slit 26 into chamber 14, forming an acute angle 32 with the chamber wall 24, and an outer portion 34 of the vane 28 extends into the annulus 36 between the chamber wall 24 and the shell 16. Wall 24 is joined to shell 16, for example, by welding, at joint 48 and around inlet 40, so that shell 16 is a sealed vessel. The diameter of ramp 18 is selected so that it fits tightly against wall 24, providing little space for gas to pass between the ramp and the wall. Ramp 18 is attached to vane 28 and wall 24 at each point where the ramp contacts slit 26 and where the first and last turns of the ramp contact wall 24. A first end 38 of chamber 14 is substantially closed except for a gas inlet 40, and a second end 42 of chamber 14 is connected to a vent 44, which is connected either to the atmosphere or to a gas collection system, not shown. The annulus 36 between shell 16 and chamber wall 24 is also substantially closed, with a drain 46 at the approximately lowermost point leading into storage tank 12.

In the first embodiment of the present invention, gas, shown as open arrows in FIGS. 1 and 2, containing entrained liquid droplets, shown as solid arrows, flows from a well or group of wells through the inlet 40 of chamber 14 to passage 22. The gas pressure is such that the gas/liquid mixture travels through helical passage 22 with sufficient velocity that centrifugal force causes the gas and liquid to separate, with the liquid droplets migrating toward them wall 24 of chamber 14. Some liquid droplets reach wall 24 and flow along them interior surface to slit 26 and then pass through slit 26 into annulus 36. Other liquid droplets impinge on the inner portion 30 of vane 28 and flow radially outward along vane 28 through slit 26. The liquid then collects in annulus 36 and gravity drains through drain 46 into storage tank 12. The gas, substantially free of liquid droplets, continues to flow through passage 22 and exits through vent 44 to the atmosphere or to a gas collection system. Shell 16 is capable of withstanding significant pressure, such as may be encountered if the liquid freezes in annulus 36.

Figure 4:
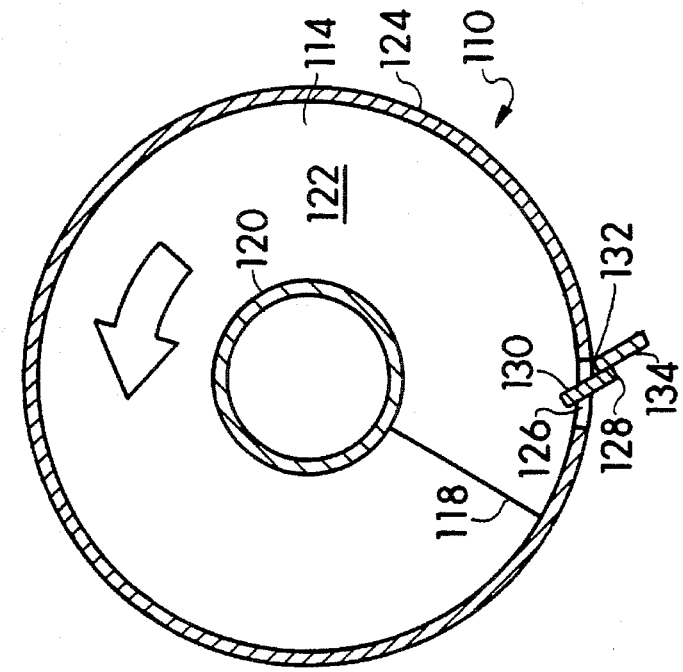
FIG. 4 is a transverse cross sectional view of the embodiment shown in FIG. 3, taken at B—B.
Figure 3:
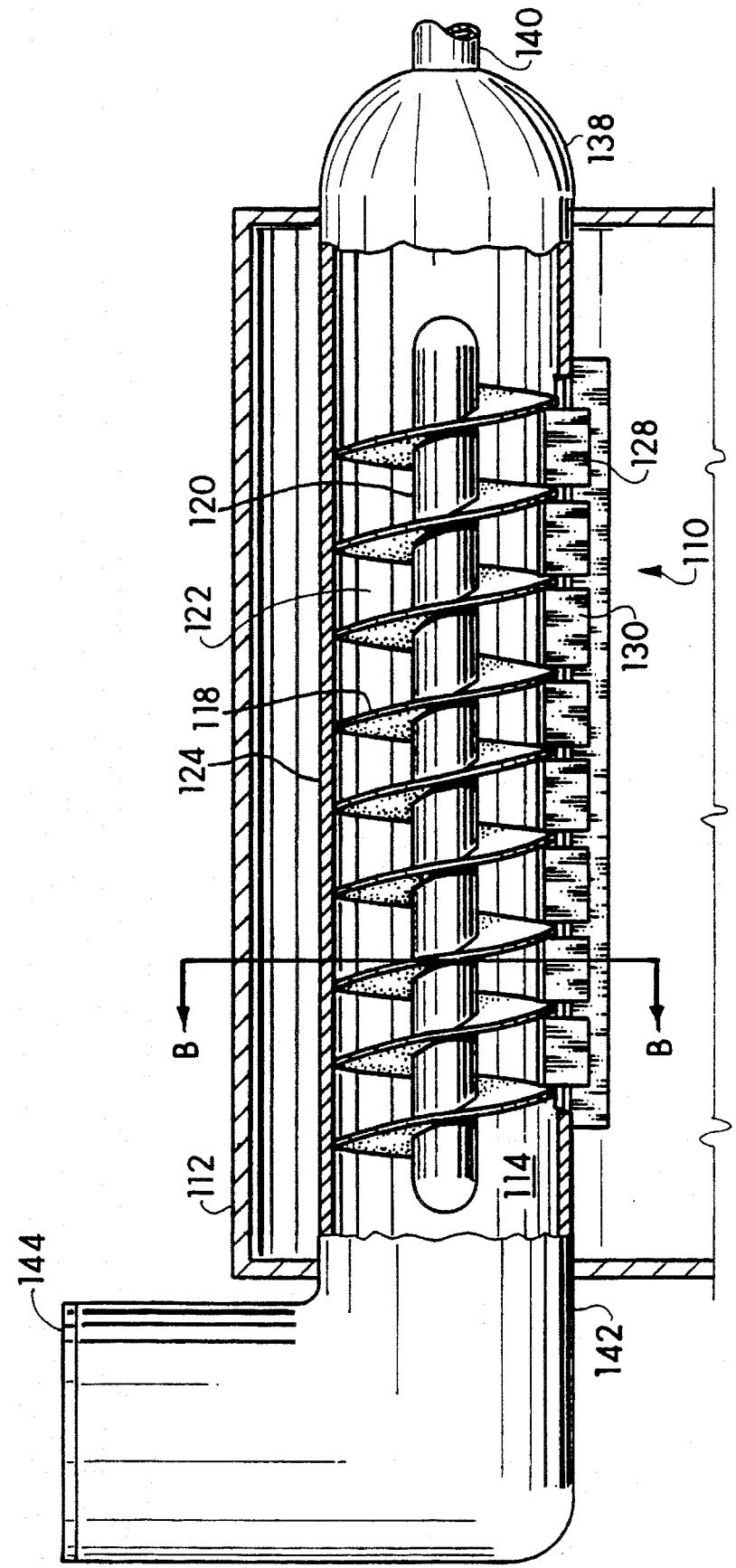
FIG. 3 is a partial cutaway view of another embodiment of the present invention.

In another embodiment of the present invention, illustrated in FIGS. 3 and 4, a gas/liquid separator 110 passes through storage tank 112 and is welded to the walls of tank 112 where the chamber wall 124 contacts the tank wall. A helical ramp 118 is attached to a central support 120 in the interior of a separation chamber 114 so that a helical passage 122 is formed between the central support 120, the ramp 118, and the chamber wall 124. At least one longitudinal slit 126 perforates the chamber wall 124. A vane 128 is mounted at the edge of the at least one slit 126 so that an inner portion 130 of the vane 128 extends through the slit 126 into chamber 114, forming an acute angle 132 with the chamber wall 124, and a second portion 134 of the vane 128 extends outside the chamber wall into interior of storage tank 112. As in the first embodiment, a first end 138 of chamber 114 is substantially closed except for a gas inlet 140 which is situated outside tank 112, and a second end 142 of chamber 114, also outside tank 112, vents either to the atmosphere or to a gas collection system, not shown.

A gas containing entrained liquid droplets flows from the well or wells into passage 122 in separator chamber 114 via inlet 140. As the gas/liquid mixture travels through helical passage 122, centrifugal force causes liquid droplets to move toward chamber wall 124. At least a portion of the droplets impinge on inner portion 130 of vane 128 and flow radially outward along vane 128 through slit 126. The liquid drains from the outer portion 134 of vane 128 directly into tank 112. The remaining gas, substantially free of entrained liquid droplets, exits passage 122 and chamber 114 via vent 44.

As is apparent to one skilled in the art, the internal and external dimensions of the separator can be selected to ensure adequate separation under the expected pressures and fluid flow rates. The materials and thicknesses of components must provide adequate rigidity and structural strength. The at least one slit should be narrow enough to limit the quantity of gas passing through the slit to the exterior of the separation chamber. Any suitable liquid storage tank may be utilized. A skid-mounted, covered tank is an economical choice that allows compliance with environmental regulations concerning the release of hydrocarbons and brine into the environment. The embodiments illustrated and described above may be used with fluids at any pressure above about 100 psi and reasonably expected in a hydrocarbon well. The separators described above have been used to separate fluids entering the separators at pressures up to 2000 psi. Gas produced from two or more wells can be combined prior to separation.

Any gas composition and any liquid composition may be separated from each other in the process of the present invention. The gas produced from a subterranean well may comprise light hydrocarbons, carbon dioxide, hydrogen sulfide, helium, air, or mixtures thereof. The liquid produced from a well may comprise hydrocarbons, brine, water, or mixtures thereof.

EXAMPLE

A well is drilled and completed in a subterranean formation and produces 80 mcf/day of gas. Periodically, the well is vented to an earthen pit, with significant release of liquid hydrocarbons into the soil and air. The well is then equipped with a gas/liquid separator of the type illustrated in FIGS. 3 and 4, mounted inside a 300-barrel skid-mounted tank. The separator chamber is approximately ten feet long with an internal diameter of nine inches, and the helical channel has a cross section of about three inches by three inches. The vane is mounted at a 30-degree angle relative to the chamber wall and protrudes ⅛ inch into the chamber. Separated liquid flows out of the chamber along the vane and then drains into the tank, and dry gas is vented to the atmosphere. Approximately 70 barrels of condensate are recovered in 45 days, equivalent to more than 550 barrels/year which previously was lost to the environment.

While the foregoing preferred embodiments of the inventions have been described and shown, it is understood that the alternatives and modifications, such as those suggested and others, may be made thereto and fall within the scope of the invention.

I claim:

1. A method for recovering entrained liquid from natural gas produced via at least one well penetrating a subterranean formation, the method comprising the steps of:

(a) flowing the gas and entrained liquid through a helical ramp in a gas/liquid separator which is located at the surface and in a fluid flow path between the at least one well and a storage tank, thereby separating the liquid from the gas via centrifugal force, the gas and entrained liquid entering the separator at a pressure greater than about 100 psi;

(b) removing the liquid from the separator via at least one longitudinal slit formed in the wall of the separator by means of a liquid impingement device which is mounted at the edge of the at least one slit;

(c) collecting the liquid in the storage tank; and (d) venting the gas from the separator.

2. The method of claim 1 wherein step (c) comprises collecting said separated liquid directly into said storage tank.

3. The method of claim 1 wherein step (d) comprises venting said gas to the atmosphere.

4. The method of claim 1 wherein step (d) comprises venting said gas to a gas collection system.

5. The method of claim 1 wherein said entrained liquid is water, brine, hydrocarbons, or a mixture thereof.

6. The method of claim 1 wherein said gas is light hydrocarbons, carbon dioxide, hydrogen sulfide, helium, air, or a mixture thereof.

7. An apparatus for recovering entrained liquid from natural gas produced via at least one well penetrating a subterranean formation, the apparatus comprising:

- a separation chamber having a substantially cylindrical wall, a helical passage within the separation chamber, and means for collecting liquid outside the chamber, the cylindrical wall perforated by at least one longitudinal slit adjacent the helical passage and having means for impinging liquid droplets mounted at an edge of each slit, the chamber located at the surface in a fluid flow path between the at least one well and a liquid storage tank;
- means for transferring the separated liquid into the storage tank; and
- means for venting the gas from the separator.

8. The apparatus of claim 7 wherein said means for impinging liquid droplets is a vane having an inner portion extending into said passage and forming an acute angle with said wall and an outer portion extending outside said wall.

9. The apparatus of claim 7 wherein said separator additionally comprises a shell outside said collection chamber and an annulus between said chamber wall and the shell.

10. The apparatus of claim 9 wherein said separator is outside said storage tank and said liquid drains through a conduit from said annulus into said tank.

11. The apparatus of claim 7 wherein said separator is mounted substantially inside said tank and said liquid drains directly from said separator into said tank.

12. The apparatus of claim 7 wherein said gas venting means releases said separated gas to the atmosphere.

13. The apparatus of claim 7 wherein said gas venting means releases said separated gas to a gas collection system.

14. The apparatus of claim 7 wherein said chamber has a substantially vertical orientation.

15. The apparatus of claim 7 wherein said chamber has a substantially horizontal orientation.

16. The apparatus of claim 11 wherein said storage tank has a top and said chamber is mounted near the top.

* * * * *